United States Patent
Singh et al.

(10) Patent No.: US 10,372,376 B2
(45) Date of Patent: Aug. 6, 2019

(54) SYSTEM AND METHOD OF ORCHESTRATING EXECUTION OF COMMANDS IN A NON-VOLATILE MEMORY EXPRESS (NVME) DEVICE

(71) Applicant: SAMSUNG ELECTRONICS CO., LTD., Suwon-si, Gyeonggi-do (KR)

(72) Inventors: Vikram Singh, Karnataka (IN); Anshul Jindal, Karnataka (IN); Saurabh Pradeep Bondarde, Karmataka (IN); Aishwarya Ravichandran, Karmataka (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 90 days.

(21) Appl. No.: 15/647,662

(22) Filed: Jul. 12, 2017

(65) Prior Publication Data
US 2018/0024778 A1    Jan. 25, 2018

(30) Foreign Application Priority Data

Jul. 22, 2016 (IN) .............................. 201641025223
Jan. 24, 2017 (IN) .............................. 201641025223

(51) Int. Cl.
  *G06F 3/06* (2006.01)
  *G06F 13/00* (2006.01)

(52) U.S. Cl.
CPC ............ *G06F 3/0659* (2013.01); *G06F 3/061* (2013.01); *G06F 3/0604* (2013.01); *G06F 3/0634* (2013.01); *G06F 3/0679* (2013.01); *G06F 3/0688* (2013.01); *G06F 13/00* (2013.01)

(58) Field of Classification Search
CPC .... G06F 3/0659; G06F 3/0679; G06F 3/0688; G06F 13/00
See application file for complete search history.

(56) References Cited

U.S. PATENT DOCUMENTS

| | | | |
|---|---|---|---|
| 2013/0297907 A1* | 11/2013 | Ki ....................... | G06F 12/0684 711/170 |
| 2014/0173149 A1* | 6/2014 | Walker ................ | G06F 9/45533 710/263 |

(Continued)

OTHER PUBLICATIONS

Dave Mintum, "NVM Express Over Fabrics," Open Fabrics Alliance, OFADevWorkshop, Mar. 2015, pp. 1-13.

(Continued)

*Primary Examiner* — Henry Tsai
(74) *Attorney, Agent, or Firm* — Volentine, Whitt & Francos, PLLC

(57) ABSTRACT

A method of orchestrating the execution of commands in a non-volatile memory express (NVMe) device includes receiving one or more commands, to be executed, from one or more host devices in one or more submission queues. One or more configuration commands are identified, from the one or more received commands, that will alter the attributes/characteristics of the NVMe device. One or more commands operating with the same attributes as the identified one or more configuration commands are also identified. And selective fencing of the identified one or more commands is initiated to orchestrate execution of commands in the NVMe device.

19 Claims, 11 Drawing Sheets

(56) References Cited

U.S. PATENT DOCUMENTS

| | | | |
|---|---|---|---|
| 2014/0181365 A1* | 6/2014 | Fanning | G06F 12/0246 |
| | | | 711/103 |
| 2014/0331001 A1 | 11/2014 | Liu et al. | |
| 2015/0186074 A1* | 7/2015 | Benisty | G06F 3/0659 |
| | | | 711/115 |
| 2016/0062669 A1* | 3/2016 | Chu | G06F 3/0611 |
| | | | 711/103 |
| 2016/0117121 A1* | 4/2016 | Bohn | G06F 3/0685 |
| | | | 711/114 |
| 2017/0123656 A1* | 5/2017 | Benisty | G06F 3/061 |
| 2017/0336988 A1* | 11/2017 | Kim | G06F 3/0611 |
| 2018/0018090 A1* | 1/2018 | Lu | G06F 3/061 |
| 2018/0052694 A1* | 2/2018 | Lee | G06F 3/061 |
| 2018/0217951 A1* | 8/2018 | Benisty | G06F 13/1642 |

OTHER PUBLICATIONS

NVM Express, Revision 1.2.1, Jun. 5, 2016, pp. 1-217.
PCI Express Base Specification, Revision 2.1, Mar. 4, 2009, pp. 1-704.
Single Root I/O Virtualization and Sharing Specification Revision 1.1, pp. 1-100.

* cited by examiner

US 10,372,376 B2

SYSTEM AND METHOD OF ORCHESTRATING EXECUTION OF COMMANDS IN A NON-VOLATILE MEMORY EXPRESS (NVME) DEVICE

RELATED ART

The disclosure claims the benefit of Indian Provisional Application No. 201641025223 filed on 22 Jul. 2016, and Indian Non Provisional Application No. 201641025223 filed on 24 Jan. 2017, by Samsung R&D Institute India-Bangalore Private Limited, which are herein incorporated in their entirety by reference for all purposes.

FIELD OF THE ART

The disclosure generally relates to a storage device and more specifically to a method of orchestrating execution of commands in a non-volatile memory express (NVMe) device.

BACKGROUND OF THE RELATED ART

The NVM Express (NVMe) specification defines a command set for PCIe-based Solid-State Drives (PCIe SSDs). It is a host/device architecture, where the hosts are the CPU cores of a server, and the device is a PCIe SSD. A standard NVMe driver is available on the host side for different operating system platforms (Linux, Windows . . . ). On the device side, the NVMe specification must be implemented in an SSD controller, where it could be a hardware or a software architecture.

An NVMe is a submission/completion queue-based protocol. The commands are created by a host device and placed in a submission queue. When a command is ready in the submission queue, the host device indicates the readiness to a connected device through a submission queue tail doorbell register update. The connected device then fetches the submission command from the host memory and executes the submission command according to its priority defined with an arbitration scheme.

An NVMe host controller provides an optimized command submission and completion path in which there may be no guaranteed order of execution and completion of NVMe commands. Alongside, support has been added for many advanced features like Namespace management, Single Root I/O virtualization (SR-IOV), Reservations etc. in the NVMe standards. For example, consider the following NVM subsystem as shown in FIG. 1 with a multi-port 102, a multi-path I/O 104, namespace sharing 106 and SR-IOV 108 support. The firmware running on such a multi-port/multi-function SSD device is expected to handle any and all incoming commands from one or more of the interfaces (Admin or I/O queues) of the virtual functions assigned to the NVMe controller, which may externally be connected to different hosts.

Many standard protocols, like the NVMe, have a set of administrative or configuration commands that configure the behavior of a device or controller, subject to the guidelines drawn by the protocol. For example, a few of the NVMe configuration commands include those for deletion of a submission queue, access permissions of a namespace via reservations, access control of a namespace via namespace management/attachment, and re-formatting a namespace with different namespace attributes like a Logical Block Address (LBA) size, protection information, aborting a previously sent command etc.

However, in an NVMe environment where parallel processing of commands is involved, these NVMe configuration commands have dependencies on other commands being executed inside the device. Here parallel processing or parallelism in NVMe environment refers to execution of one or more commands simultaneously by a multi-core processor.

The NVMe specification is unprecedented in its architecture for not enforcing an order of execution or completion of commands. Thus, in the NVMe realm, the problem of command interdependencies is considerably new to device designers and firmware developers. While in single-function-single-host devices, the dependencies will be of a lesser degree, as a single ideal host can manage to resolve the explained command conflicts cleanly. However, this is not true for a multiport-multifunction device.

FIG. 2 illustrates an NVMe environment where the host is managing the command dependencies, rather than the device. In this scenario, as well, problems arise such that the environment cannot work for a multi host scenario, as the device health will not be monitored by the host, and uncooperative hosts remains an issue. The NVMe specification is unprecedented in its architecture of not enforcing order of execution or completion of commands. Thus, in the NVMe realm, the problem of command interdependencies is considerably new to device designers and firmware developers. While in single-function-single-host devices, the dependencies will be of a lesser degree as a single good host can manage to avoid resolving the explained command conflicts cleanly as shown in FIG. 2. However, this is not true for a multi-function-multi-host device.

FIG. 3 is a schematic diagram illustrating a method of managing dependencies by a hypervisor, according to a related art. The command interdependencies may be resolved by a hypervisor layer that is introduced between the host and the drive as shown in FIG. 3. The hypervisor layer 302 is adapted to allocate hardware resources of the host device 308 to one or more virtual machines in real-time. However, such a solution also exhibits issues, such as unnecessary complexity in the system, increased overhead/synchronization and the like.

In view of the foregoing, there is a need for a method for resolving command interdependencies in a non-volatile memory express (NVMe) multiport-multifunction environment.

SUMMARY OF THE DISCLOSURE

A method of orchestrating execution of commands in a non-volatile memory express (NVMe) device includes receiving one or more commands, to be executed, from one or more host devices in one or more submission queues. One or more configuration commands are identified from the one or more received commands. The one or more configuration commands alter an attribute or characteristic of the NVMe device. One or more commands operating with the same attribute as the identified one or more configuration commands are also identified. Selective fencing of the identified one or more commands is initiated to orchestrate the execution of commands in the NVMe device. Orchestrating refers to regulating the NVMe command flow for execution and completion, by controlling the way in which the NVMe commands enter an execution pipeline.

According to an embodiment of the disclosure, a system for orchestrating execution of commands in a non-volatile memory express (NVMe) device includes one or more host devices and the non-volatile memory express (NVMe)

device connected to the one or more host devices. The non-volatile memory express (NVMe) device is configured for receiving one or more commands, to be executed, from the one or more host devices in one or more submission queues. One or more configuration commands is identified from the one or more received commands. The one or more configuration commands change an attribute or state of the NVMe device. Selective command fencing is initiated upon identifying the one or more configuration commands, so as to orchestrate the execution of the commands in the NVMe device.

According to an embodiment of the disclosure, a method executed by a nonvolatile memory express (NVMe) device includes receiving, from one or more external hosts, a plurality of commands to be executed by a multi-core processor of the NVMe device in parallel. Among the commands, a first set of commands that are all directed toward the same attribute of the NVMe device is identified. A first command, among the first set of commands, whose execution affects an execution outcome of another command within the first set is also identified. The first command is submitted to a parallel-processing execution pipeline for execution by the NVMe device in response to determining that a state of the attribute is idle. Execution of each command within the first set whose execution is affected by the execution of the first command is deferred until after the first command is executed.

BRIEF DESCRIPTION OF THE ACCOMPANYING DRAWINGS

Objects, features, and advantages of the disclosure will occur to those skilled in the art from the following description of the preferred embodiments and the accompanying drawings in which.

Although specific features of the present disclosure are shown in some drawings and not in others, this is done for convenience only, as each feature may be combined with any or all of the other features in accordance with the present disclosure.

DETAILED DESCRIPTION

The disclosure describes a system and method of orchestrating execution of commands in a non-volatile memory express (NVMe) device. The method resolves command interdependencies in an NVMe multiport multifunction environment. According to an embodiment of the disclosure, the method applies command fencing within the device, which resolves command dependencies in multiport multifunction NVMe devices.

Figure 1:
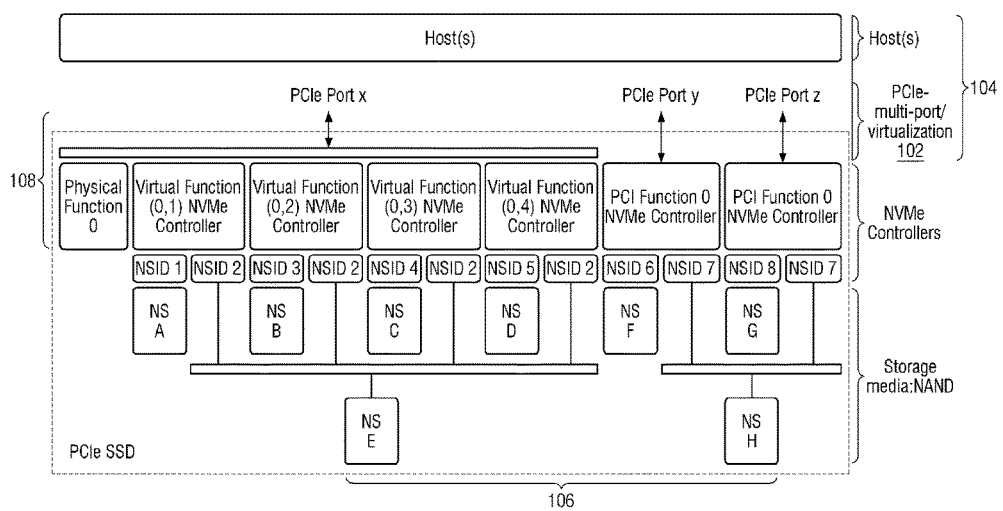
FIG. 1 is a schematic diagram illustrating an NVMe subsystem, according to a related art.
Figure 2:
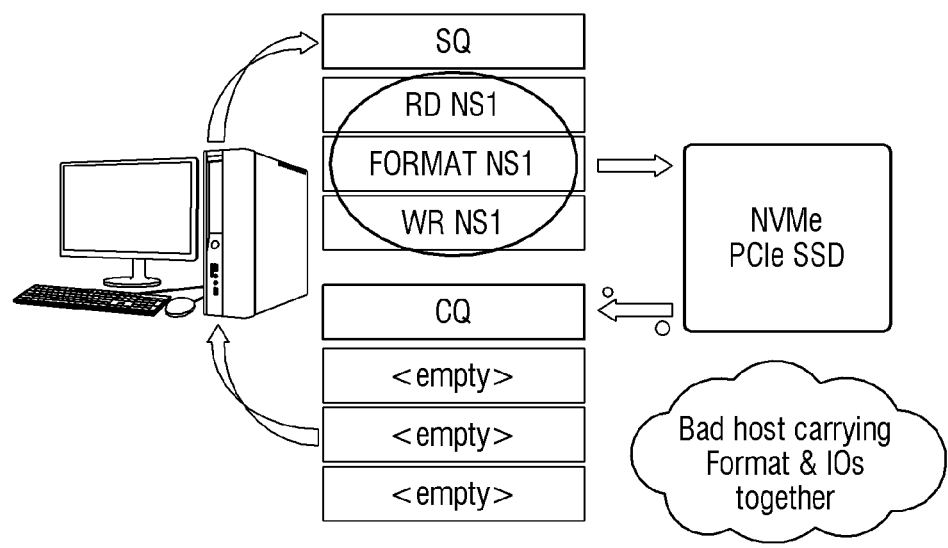
FIG. 2 is a schematic diagram illustrating a single host issuing commands without tackling the interdependencies which may lead to bad device health, according to a related art.
Figure 3:
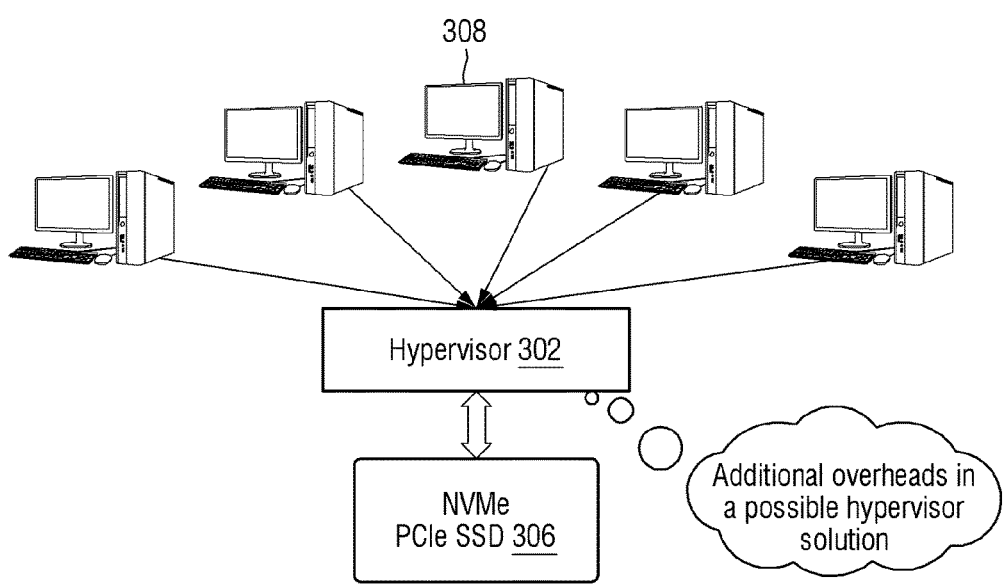
FIG. 3 is a schematic diagram illustrating a method of managing dependencies by a hypervisor, according to a related art.

FIG. 1 is a schematic diagram illustrating an NVMe subsystem, according to a related art. The FIG. 1 illustrates a high level Peripheral Component Interconnect Express (PCIe) based Solid state drive's (SSD) architecture. Generally, PCIe SSDs are connected directly with Host via PCIe Bus. The NVMe is a scalable host controller interface designed to address the needs of Enterprise and Client systems that utilize such PCIe SSDs. In such an NVMe subsystem, a plurality of interfaces (Admin/IO queues) may exist for the transmission of data between a host/s and SSD drive controller. For example, consider NVM subsystem in the FIG. 1 with multi-port 102, multi-path I/O 104, namespace sharing and SR-IOV (virtualization) supported. The firmware running in such a multi-function SSD drive is required to handle any and all incoming commands from one or more of the interfaces (Admin or I/O queues) from one or more of the functions/ports. It is to be noted that in NVMe there may be no guaranteed order in the execution and completion of commands.

Figure 4:
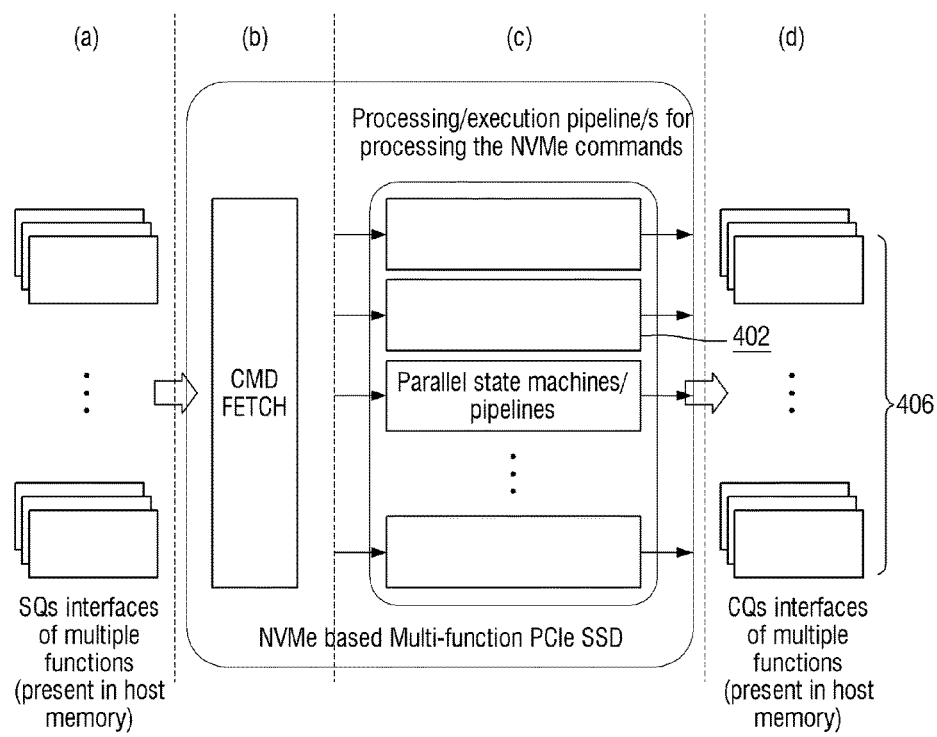
FIG. 4 is a schematic diagram illustrating an architectural model of a conventional non-volatile memory express (NVMe) device, such as a Solid-State Drive (SSD) and the various stages of execution inside any NVMe based device, according to a related art.

FIG. 4 illustrates an architectural model of a related art NVMe device, such as a Solid-State Drive (SSD) and the various stages of execution inside an NVMe based device. Processing/execution pipelines 402, may spread across multiple cores, hardware pipelines, Flash Translation (FTL) layers and/or parallel state machines. Also, the processing of a single command in any of these cores/pipelines may not be in a 'run to completion' fashion, rather command execution may be asynchronous in nature, where another command can be taken up for execution before execution of the current command is completed.

According to an embodiment of the disclosure, a command that is submitted by the host device to the NVMe submission queues may be in one of the following stages:
  a) present in a submission queue (SQ) and not fetched by a controller;
  b) fetched by the controller (internal SQ head pointer updated) but not started in internal processing/execution;
  c) in the internal processing/execution pipeline of the controller; and
  d) present in a completion queue 406 in a host.

According to an embodiment of the disclosure, a selective fencing technique ensures that configurations done in the device are guaranteed to be atomic and no other dependent commands in the device will execute in parallel during the device's configuration. Here atomic refers to atomic access provided to an NVMe configuration, where during an update of the configuration on which atomic access is implied, no other command will refer to the same configuration.

The configuration commands are rare and typically sent during system initialization, system reset, administrative operation/override or any similar critical situations. These configuration commands have the privilege to negatively impact performance, as they are more crucial than input-output operations. The underlying design of the NVMe protocol is to facilitate maximum performance without restrictions on command ordering. However, actual device implementations have shared resources and status variables/flags which require atomic update. It is due to such requirements that dependencies exist, although not explicitly mentioned in the specification. The fencing logic is permitted to selectively fence only dependent commands and ensure atomicity of the configuration done. All other commands in the device are unaffected. Fencing a command is equivalent to deferring the execution of that command until the previous dependent commands complete execution.

According to the disclosure, a selective command fencing mechanism is developed based on the status of the namespace on an SSD controller. The mechanism can be extended to any other resource and is not limited only to namespace. The following commands were selected as configuration commands with respect to the status of the namespace, such as:

NVM Format
Reservation Acquire (Preempt)
Reservation Acquire (Preempt and Abort)
Namespace Attachment (Detach)
Namespace Management (Delete)
Namespace Sanitize The NVMe specification mentions whether the Namespace Identifier (NSID) field is used for a particular command. As the command fencing mechanism is based on the status of the namespace, only commands that use the NSID field are relevant. Thus, all incoming commands are selectively fenced based on their NSID field and the current status of the namespace in the device.

Figure 5:
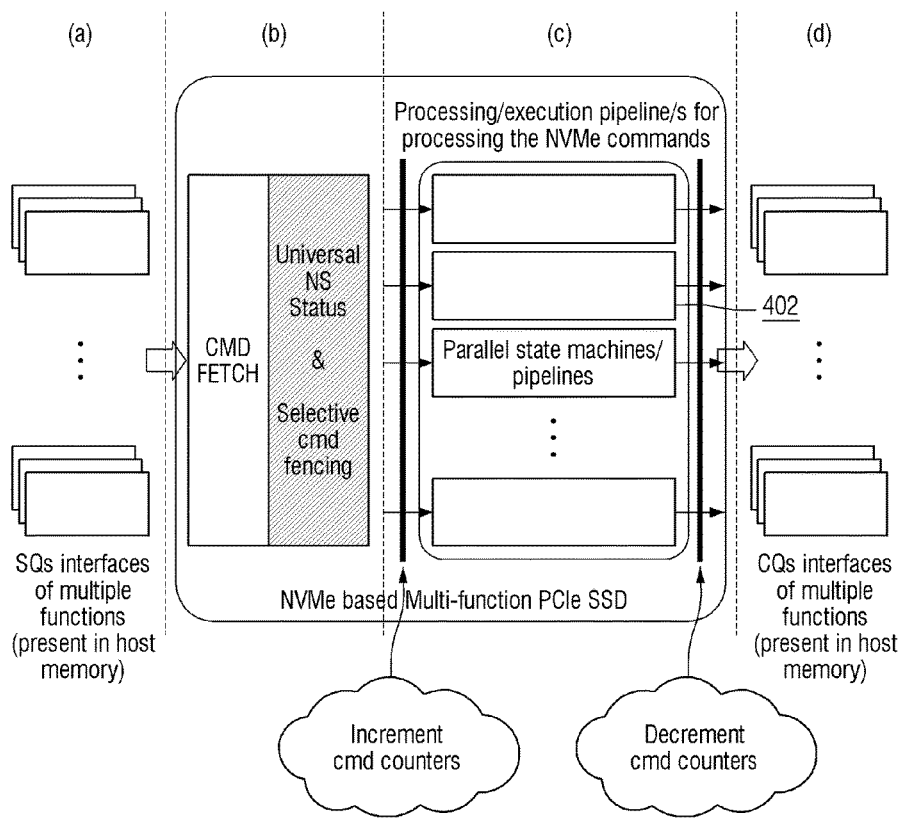
FIG. 5 is a schematic diagram illustrating components introduced in the Solid-State Drive (SSD) architecture and modified stages of execution inside a NVMe based device, according to an embodiment of the present disclosure.

FIG. 5 is a schematic diagram illustrating components introduced in the Solid-State Drive (SSD) architecture and modified stages of execution inside an NVMe based device, according to an embodiment of the present disclosure.

In one embodiment, one or more commands, to be executed, are received from one or more host devices in one or more submission queues. Then, one or more configuration commands such as Input/output Commands or administration commands are identified from the one or more received commands, intended to alter the attributes/characteristics of the NVMe device such as a Namespace format or Logical Block Address (LBA) format. In one embodiment, the configuration commands comprise at least one of an abort command, a Reservation Acquire (Preempt) command, a Reservation Acquire (Preempt and Abort) command, a Namespace Attachment (Detach) command, a Namespace Management (Delete) command, and a namespace sanitize command.

The SSD architecture includes the following components, according to the disclosure, to provide effective selective command fencing:

i) Status Maintenance Module

A status maintenance module is adapted for maintaining a universal status of a resource, for example, a namespace.

In one example embodiment, the status of a namespace is updated to 'Namespace Deleting' in the status maintenance module, if it is undergoing Namespace Management-delete operation. The universal status of the namespace is updated only when a configuration command is being processed/executed. Multiple configuration commands may or may not be allowed to operate on the namespace depending on the feasibility of parallel operation, for example if two or more hosts send a Namespace Reservation Acquire request to the device, then device should uniquely be assigned to one host and not more as per the specification. However, the device may allow the multiple requests to execute simultaneously if the requests are for different namespaces.

ii) Counter Updation Module

A counter updation module is adapted for maintenance of counters of currently executing commands on each resource. In one example embodiment, a counter to track the number of commands with Reservation Conflict error currently 'inside' the controller is maintained.

The command counters are incremented between selective command fencing and processing/execution for processing of the NVMe commands based on the status of the namespace indicated in the stages (b) and (c), and decremented between processing/execution pipelines for processing the NVMe commands and completed queues of multiple functions as indicated in stages (c) and (d) as shown in FIG. 5. Thus, at any point of time, the value in the counter reflects the number of commands that are actually engaged in the controller's processing/execution pipeline. The counters are used when a configuration command has to wait till the commands in the processing/execution pipeline are executed.

In one example embodiment, every incoming command is selectively fenced between stages (b) and (c) as shown in FIG. 5, and based on the universal status of the namespace, execution of normal commands is withheld until the on-going configuration command completes execution.

This fencing will only happen when the namespace is undergoing a status-transition due to some configuration command. When no such critical command is executing, the universal status shall be 'IDLE', thus the impact on performance due to such fencing is minimal and only limited to events of status transitions.

Figure 6:
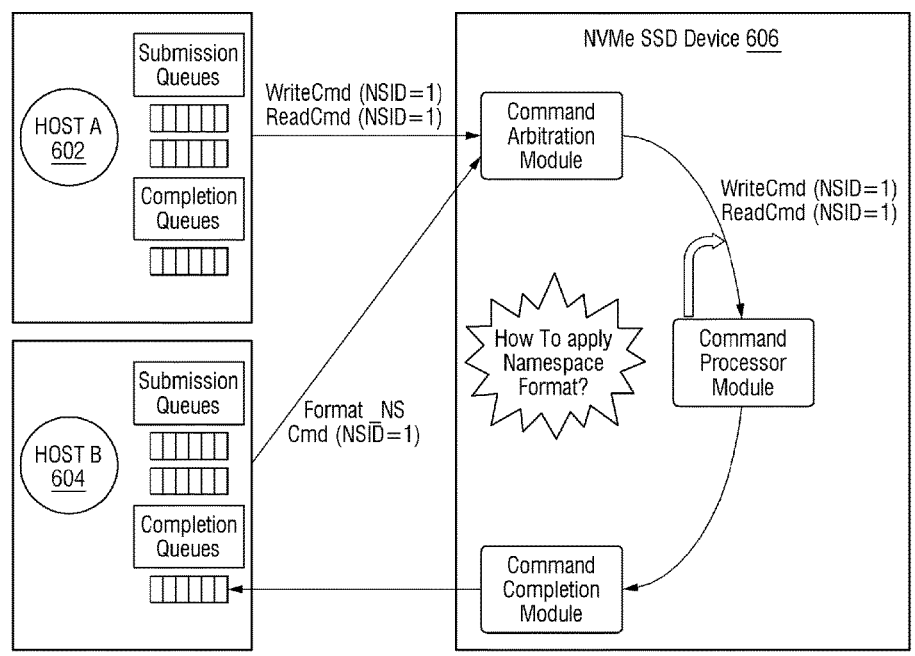
FIG. 6 illustrates an NVMe command processing system explaining a possible ambiguity in command execution order that can arise with no strict ordering rules mentioned in the NVMe specification, according to a related art.

FIG. 6 illustrates an NVMe command processing system explaining the possible ambiguity in command execution order that can arise, due to no strict ordering rules mentioned in the NVMe specification. In one embodiment, Namespace 1 is attached to both Host A 602 and Host B 604. There are two commands, write and read on namespace 1 from the Host A 602 that are under execution inside the device. A Namespace (NS) format command is submitted by Host B for the same Namespace 1. There are two more commands—write and read on the same namespace 1 from Host A. These two commands are just fetched inside the device 606 but execution has not started. Here configuring the NVMe device 606 as a part of Namespace format command execution without any consideration may lead to device inconsistency with respect to command execution. In such a scenario, selective command fencing helps in solving command interdependencies by flushing the internal pipelines by completing execution of the initial write and read commands from Host A and then executing the NS format and then executing the last read and write commands from Host A.

Figure 7:
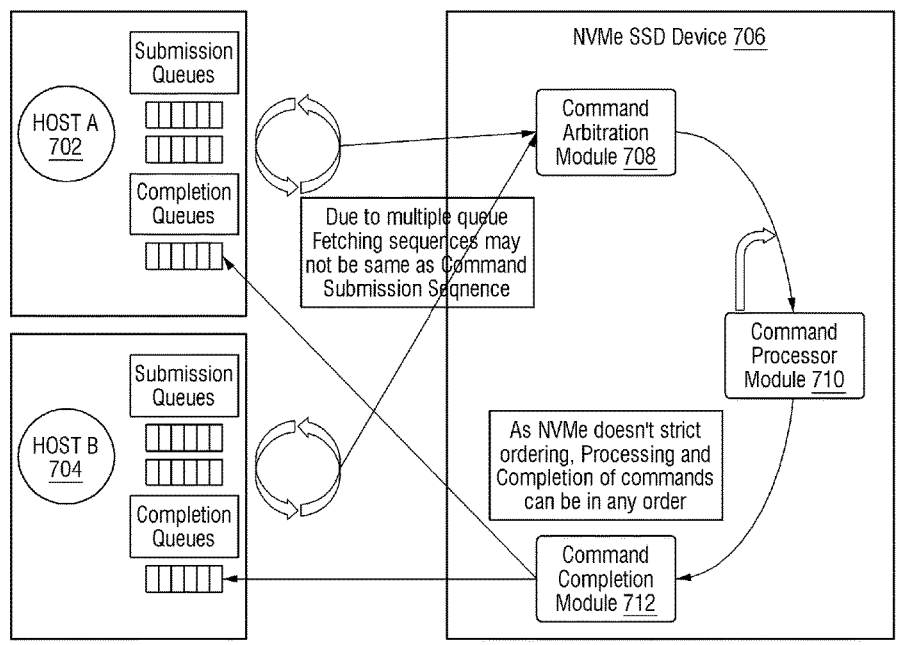
FIG. 7 illustrates an NVMe command processing system explaining an inherent uncertainty in a command fetch and completion order, according to an embodiment of the present disclosure.

FIG. 7 illustrates an NVMe command processing system explaining the inherent uncertainty in the command fetch and completion order, according to an embodiment of the present disclosure. The FIG. 7 explains the high-level host and device interaction in the NVMe protocol and how the fetch and completion order of commands are not restricted in NVMe. Each host can have multiple submission and completion queues. In one embodiment, the system includes two host devices i.e. Host A 702 and Host B 704 and an NVMe Device 706. The NVMe Device 706 includes a command arbitration module 708, a command processor module 710, and a command completion module 712. Each host, host A 702 and host B 704 has multiple submission and completion queues. The host A 702 and host B 704 can choose to submit commands in any of its submission queues. After processing the commands, the NVMe device 706 posts the response in corresponding completion queues. The device 706 follows a fetch policy to ensure fairness. Arbitration policy is applied among different queues of a host and across different hosts.

In the NVMe 706, multi-queue interfaces and the arbitration policy together create uncertainty as to which commands from which queues will be fetched inside the device first. Thus, there is no guaranteed order of fetch; the fetch order depends on the current fetch position of the arbitrator inside the device 706.

Figure 8A:
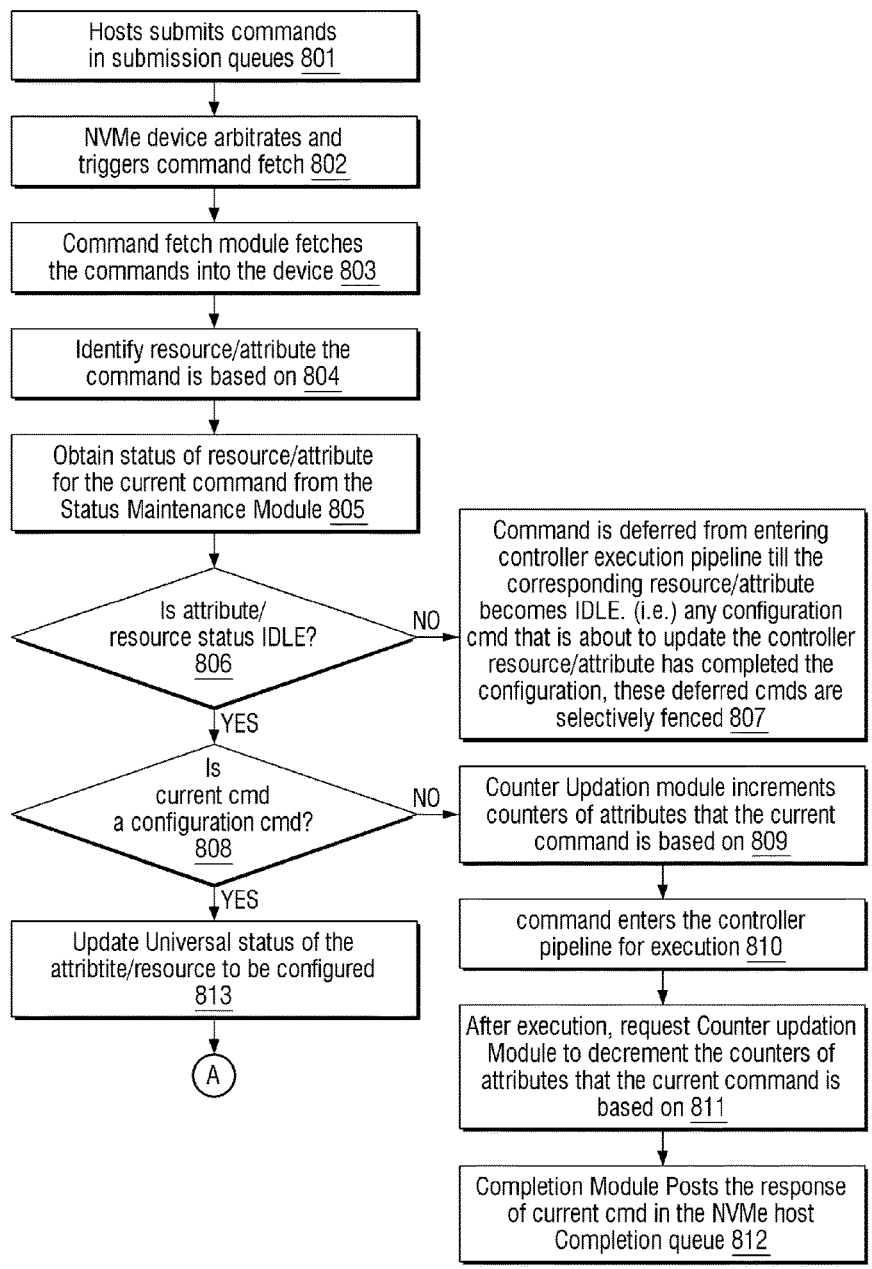
FIGS. 8A, 8B illustrate a flow diagram of a method of orchestrating execution of commands in a non-volatile memory express (NVMe) device, according to an embodiment of the present disclosure.
Figure 8B:
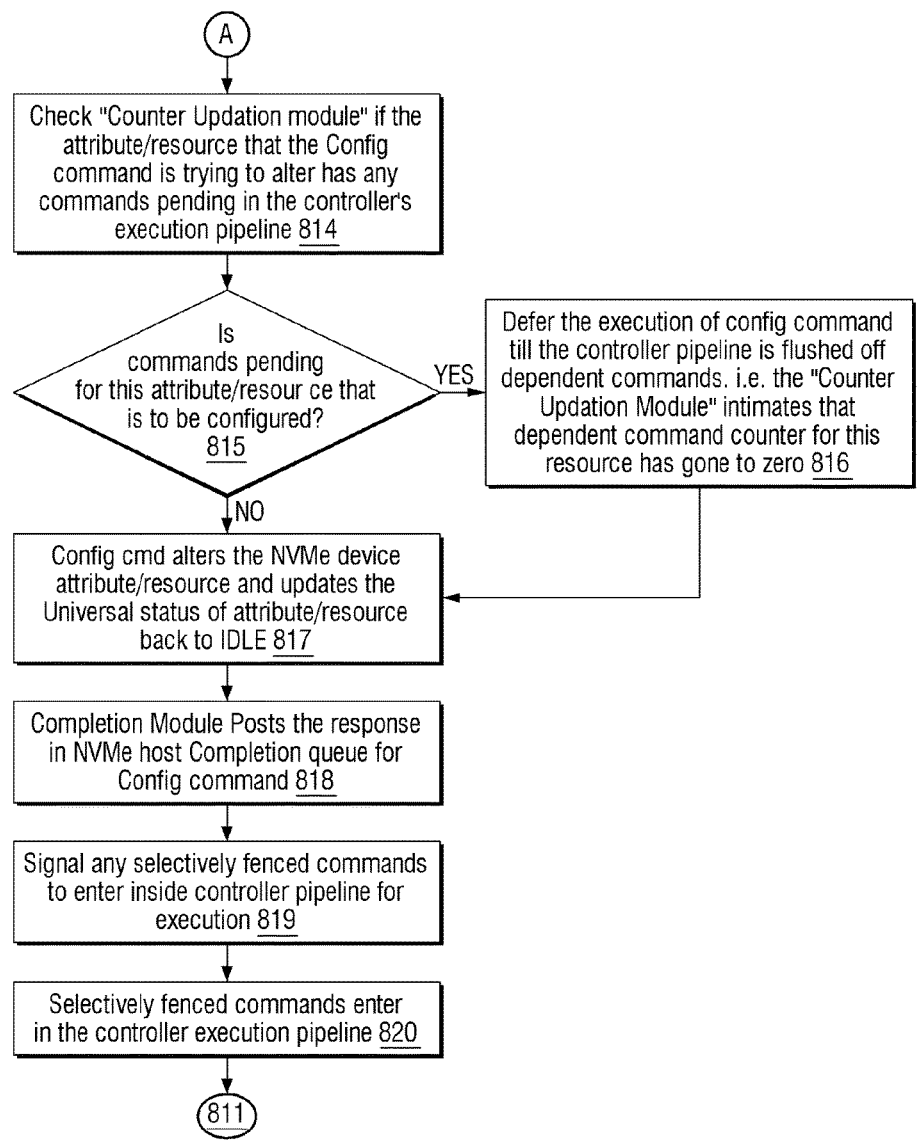

FIGS. 8A and 8B illustrate a method of orchestrating execution of commands in the non-volatile memory express (NVMe) device 706, according to an embodiment of the present disclosure. At step 801, one or more commands are submitted by the host device in one or more submission queues. At step 802, the NVMe device 706 arbitrates and triggers a command fetch. At step 803, the commands are fetched into the NVMe device 706 by a Command fetch module. At step 804, the NVMe 706 identifies a resource/attribute upon which the command is based. For example, a read command (cmd) is based on namespace (NS) as one of its attribute. A Status Maintenance Module maintains a current status of all resource/attributes in an NVMe controller. At step 805, the NVMe 706 obtains the current status of a resource/attribute from the Status Maintenance Module. For example, a read command (cmd) concerns the status of a namespace on which the command operates. At step 806, a check is performed as to whether the status of the resource/attribute is IDLE. If not IDLE, at step 807, the command is deferred from entering a controller execution pipeline until a corresponding resource/attributes becomes IDLE, i.e. any configuration cmd that is about to update the controller resource/attribute has completed execution. Deferred cmds are "selectively fenced". If the resource/attribute is IDLE, at step 808, NVMe 706 checks whether the current command is a configuration command. If the current command is a not a configuration command, at step 809, a counter updation module increments the counter of attributes upon which the current command is based. For example, a read command on NSID 1 operates on namespace 1 as an attribute and the command counter corresponding to NS 1 is incremented to indicate that NS 1 as a resource has commands operating on it. At step 810, the command enters the controller pipeline for execution. After execution of the command, at step 811, the Counter updation Module is requested to decrement the counters of attributes upon which the current command is based. Here the increment and decrement of the counter updation module is performed based on the status of the pending commands in the controller execution pipeline. At step 812, a response of the current command is posted in the NVMe host Completion queue by the Command Completion Module 712.

If the current command is identified at step 808 as the configuration command, then at step 813, a Universal status of the attribute to be configured is updated. For example, if NSID 1 is requested to be deleted, the universal status of NS 1 is changed from IDLE to DELETING. At step 814, the Counter Updation module is checked to determine whether the attribute/resource that the configuration command is trying to alter has any pending commands in the controller execution pipeline. At step 815, NVMe 706 determines whether there are any pending commands present for the attribute/resource to configure. If YES, (there are pending commands), at step 816, the execution of a configuration command is deferred until dependent commands are cleared from the controller pipeline. Such clearance will be indicated when a dependent command counter for that resource reduces to zero. The dependent command counter is updated by the Counter Updation Module. If NO, (there are NO pending commands) at step 817, the NVMe device 706 attribute/resource is altered by the configuration command and also the universal status of the attribute/resource is updated back to IDLE. At step 818, a response of the configuration command is posted by a completion module in a completion queue. At step 819, the NVMe 706 causes any selectively fenced commands to enter the controller's execution pipeline. At step 820, the selectively fenced commands enter the controller execution pipeline and then the execution process continues from step 811.

Figure 9:
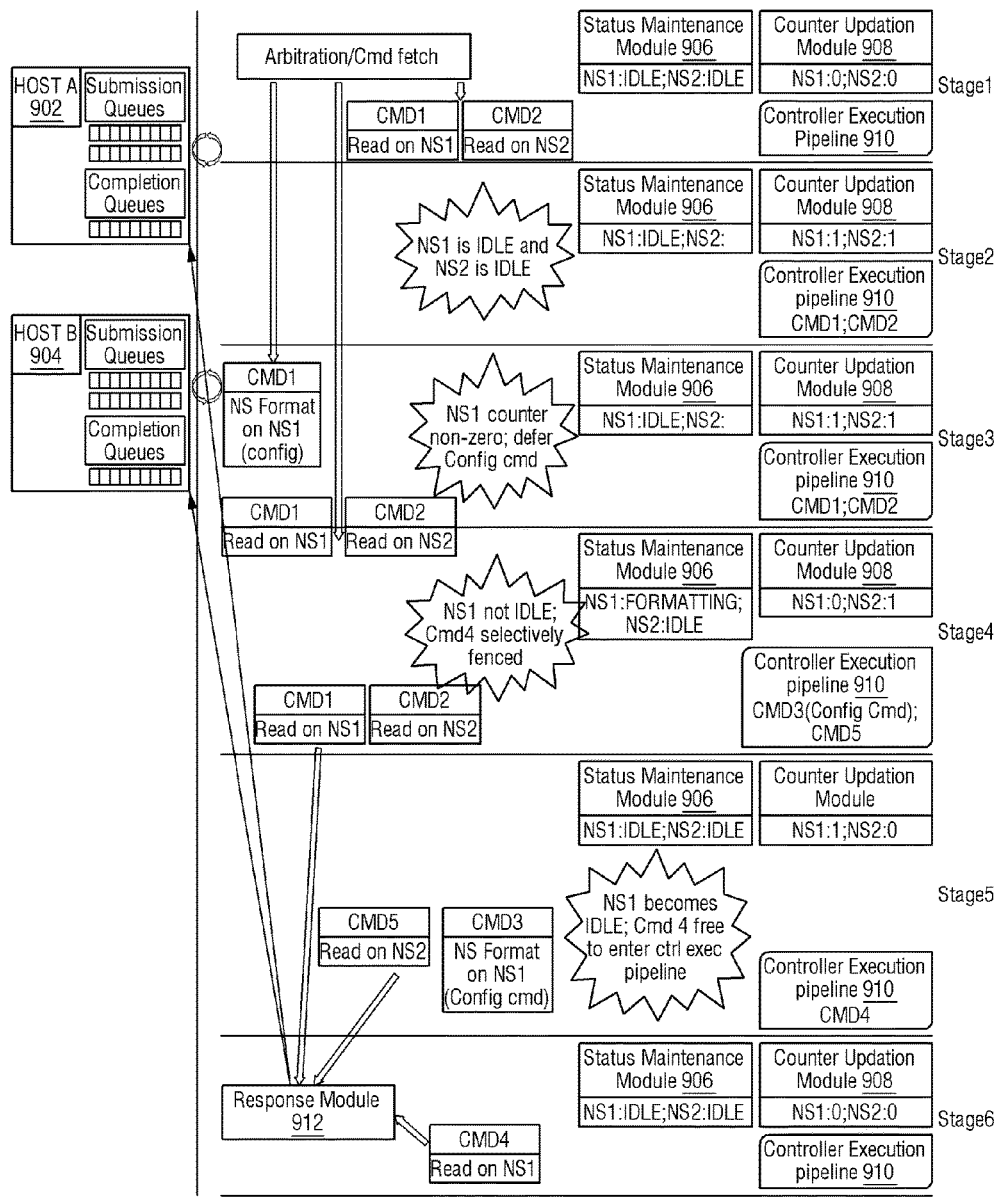
FIG. 9 illustrates an example with 'Namespace' as a resource and 'Namespace Format' as the configuration command and illustrates a method of orchestrating execution of commands in a non-volatile memory express (NVMe) device, according to an embodiment of the present disclosure.

FIG. 9 illustrates an example flow diagram of a method of orchestrating execution of commands in a non-volatile memory express (NVMe) device, according to an embodiment of the present disclosure. In this embodiment, there are two host devices, HOST A 902 and HOST B 904. Each host device has one or more submission queues and one or more completion queues. HOST A 902 and HOST B 904 send one or more commands to the NVMe device 706. The processing of these commands in the NVMe device 706, are split into six stages for explanation purpose. In the first stage, received commands 1 and 2 are read commands on namespace 1 (NS 1) and namespace 2 (NS 2), respectively. A status maintenance module 906 indicates the universal status of attributes NS 1 and NS 2 as IDLE. A counter updation module 908 indicates command counters corresponding to NS 1 and NS 2 as zero.

In the second stage, the command counters corresponding to NS 1 and NS 2 are increased by 1 upon receipt of cmd 1 and cmd 2. So, the counter updation module 908 indicates counters for NS 1 and NS 2 as 1. Since the universal status for the attributes NS 1 and NS 2 are IDLE, the commands cmd 1 and cmd 2 enter into the controller execution pipeline 910.

In the third stage, a third command cmd 3 is received which is a namespace format command for NS 1. This cmd 3 is a configuration command which is deferred from entering into the controller execution pipeline 910 because the command counter for NS 1 is 1. This means the configuration command cmd 3 is kept on hold until the cmd 1 for the attribute NS 1, already inside the controller execution pipeline, is executed. Once the cmd 1 and cmd 2 are executed, the command counters for NS 1 and NS 2 change to 0.

In the fourth stage, the configuration command cmd 3 enters inside the controller execution pipeline 910. Since cmd 3 is a configuration command, the status for the attribute NS 1 changed to FORMATTING from IDLE. Now, two commands cmd 4 and cmd 5 for the attribute NS 1 and NS 2 respectively are received. Since the status for the attribute NS 2 is IDLE, the command cmd 5 is allowed to enter the controller execution pipeline. Whereas, selective fencing is initiated for the command cmd 4 because the status for the attribute NS 1 is not IDLE. The command cmd 5 is executed without any restriction. After the command cmd 3 is executed, the status of attribute NS 1 would change to IDLE.

In the fifth stage, the status for the attribute NS 1 and NS 2 is IDLE. Now the fencing is removed and cmd 4 enters into the controller execution pipeline 910.

In the sixth stage, the cmd 4 is executed and the command counter for NS 1 is decremented from one to zero.

After any command completes its execution, the response is posted to the NVMe host completion queue by the response module 912.

Figure 10:
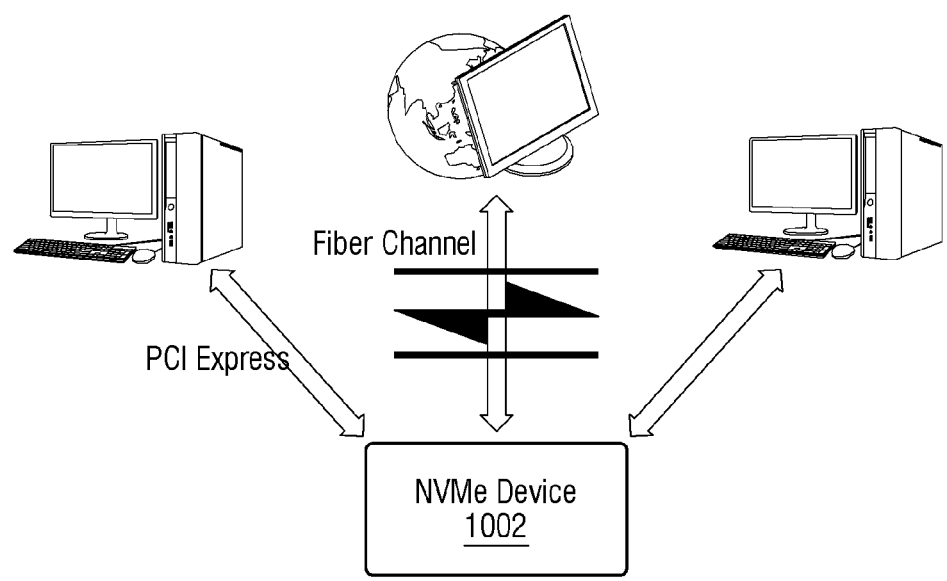
FIG. 10 illustrates a system for orchestrating execution of commands in a non-volatile memory express (NVMe) device over a multitude of fabrics, according to an embodiment of the present disclosure.

FIG. 10 illustrates a system for orchestrating execution of commands in a non-volatile memory express (NVMe) device, according to an embodiment of the present disclosure. In this embodiment, one or more host devices are connected to the NVMe device 1002 through a multitude of fabrics. In such scenarios of NVMe over fabrics, synchronizing various hosts and handling interdependencies becomes complicated. Handling these interdependencies by selective command fencing within the device removes the overhead of managing interdependencies by the fabric layer. The method described in the present disclosure efficiently handles all interdependencies, without requiring any protocol translation, in a fabric agnostic manner, which means irrespective of the interconnection fabric between the device and the host device such as example, Ethernet, PCIe, Fiber channel, infiband, or the like, The embodiments of the present disclosure provide for a:

Well defined architecture level design to handle all types of dependencies: The command fencing mechanism handles all corner scenarios that could result from the described dependencies in a multi-port/virtualization NVMe Subsystem. This enables the host to probe less into the ordering restrictions and synchronization overheads. For example, a host need not wait for all outstanding IOs on a namespace initiated by it or on any other host/s in the subsystem to complete, before sending a NVM Format for that namespace. Instead, the host may directly send the NVM Format and the device will handle such dependencies of the NVM ecosystem.

All-in-device compact solution for end-to-end specification compliance: The same design handles NVMe specification driven ordering restrictions inside the device.

Increased robustness of device: With such a mechanism, the controller is robust to handle and not let the device hang or reset, with well-defined smooth transitions from one status to another for a namespace or any chosen resource.

Readily customizable for vendor/OEM requirements: In the storage industry, OEMs demand customized solutions for permissions and dependencies for the vendor specific commands. This can be efficiently met with the selective fencing component and simply appending new fencing logic as explained earlier.

Minimal performance impact: The performance impact due the introduced logic of command fencing was calculated and found to be minimal (<1%) in terms of I/O per second (IOPS).

Low memory footprint

Extremely easy to scale to future additions and even other designs: Extensions to maintain ordering restrictions introduced in future NVMe specification versions, and other cases that demand flushing of the internal processing/execution pipeline can be easily added. With features like Virtualization, Directives, etc., new resources like queues, interrupt lines, streams are being introduced which are bound to add the explained dependencies.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Although the embodiments herein are described with various specific embodiments, it will be obvious for a person skilled in the art to practice the disclosure with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

We claim:

1. A method of orchestrating execution of commands in a nonvolatile memory express (NVMe) device, the method executed by the NVMe device and comprising:

receiving the commands in a submission queue and from a host device;

identifying, from the commands, a configuration command that changes a state or an attribute of the NVMe device, where the attribute of the NVMe device comprises at least one of a Logical Block Address (LBA) size, protection information, and aborting a previously sent command; and executing, in response to identifying the configuration command, selective command fencing that orchestrates the execution of the commands in the NVMe device, wherein for each of a plurality of first commands among the commands, the selective command fencing comprises determining whether the first command is to be executed before or after execution of the configuration command based upon whether first command operates with an attribute that the configuration command will alter.

2. The method of claim 1, wherein for each of the plurality of first commands, the selective command fencing further comprises:

executing the first command before the execution of the configuration command in response to determining that the first command is to be executed before the execution of the configuration command;

executing the configuration command; and executing the first command after the execution of the configuration command in response to determining that the first command is to be executed after the execution of the configuration command.

3. The method of claim 2, wherein each of the first commands exists in a controller execution pipeline before the configuration command is received in the controller execution pipeline.

4. The method of claim 2, wherein each of the first commands is not within a controller execution pipeline at the time the configuration command is received within the controller execution pipeline.

5. The method of claim 1, further comprising for each of the commands:
identifying a first attribute upon which the command is based;
determining a state of the first attribute;
deferring entry of the command into a controller execution pipeline until the first attribute is changed to an idle state;
determining whether the command is the configuration command;
incrementing a counter value of the first attribute in response to determining both that the state of the first attribute is the idle state and that the command is not the configuration command;
allowing entry of the command into the controller execution pipeline for execution;
decrementing the counter value of the first attribute after executing the command; and
posting a response of the executed command in an NVMe host completion queue.

6. The method of claim 5, further comprising:
updating a universal status of the attribute in response to determining the command is the configuration command;
deferring execution of the configuration command until the controller execution pipeline has no pending commands dependent on the attribute;
executing, in response to determining that the controller execution pipeline has no pending commands dependent on the attribute, the configuration command to alter the attribute;
updating, after execution of the configuration command, the universal status of the attribute to the idle state; and
posting a response of the executed configuration command in the NVMe host completion queue.

7. The method of claim 1, wherein the configuration command comprises:
an Abort command;
a Reservation Acquire (Preempt) command;
a Reservation Acquire (Preempt and Abort) command;
a Namespace Attachment (Detach) command;
a Namespace Management (Delete) command;
a Namespace Sanitize command;
a Delete Input/output (I/O) Submission queue command; or
a Delete Input/output (I/O) Completion queue command.

8. A system for orchestrating execution of commands in a nonvolatile memory express (NVMe) device, the system comprising:
a host device; and
the NVMe device connected to the host device, wherein the NVMe device:
receives the commands in a submission queue and from the host device,
identifies, among the commands, a configuration command for changing a state or an attribute of the NVMe device, and
initiates, in response to identifying the configuration command, selective command fencing that orchestrates the execution of the commands in the NVMe device, wherein
for each of a plurality of first commands among the commands, the selective command fencing comprises determining whether the first command is to be executed before or after execution of the configuration command based upon whether first command operates with an attribute that the configuration command will alter.

9. A method executed by a nonvolatile memory express (NVMe) device, the method comprising:
receiving, from one or more external hosts, a plurality of commands to be executed by a multi-core processor of the NVMe device in parallel;
identifying, among the commands, a first set of commands that are all directed toward a same attribute of the NVMe device;
identifying a first command, among the first set of commands, whose execution affects an execution outcome of another command within the first set;
submitting the first command to a parallel-processing execution pipeline for execution by the NVMe device in response to determining that a state of the attribute is idle; and
deferring, until after the first command is executed, execution of each command within the first set whose execution is affected by the execution of the first command.

10. The method of claim 9, further comprising:
executing all commands that are directed toward the attribute and were submitted into the execution pipeline before the first command, and
executing the first command in response to completing the execution of all the commands that are directed toward the attribute and were submitted into the execution pipeline before the first command.

11. The method of claim 10, further comprising altering the attribute through the execution of the first command.

12. The method of claim 10, further comprising submitting all commands within the first set whose execution was deferred in response to completing the execution of the first command.

13. The method of claim 9, wherein the first command is one whose execution: (1) deletes a submission queue of the NVMe device, (2) grants an access permission of a namespace through a reservation, (3) grants access control of a namespace of the NVMe device through namespace management or a namespace attachment, or (4) reformats the namespace with a different namespace attribute.

14. The method of claim 13, wherein the namespace attribute is a logical block address size, protection information, or an indication to abort a previously received command.

15. The method of claim 9, further comprising changing the state of the attribute to a state other than an idle state in response to submitting the first command to the execution pipeline.

16. The method of claim of claim 15, further comprising changing the state of the attribute to the idle state in response to executing the first command.

17. The method of claim 16, further comprising submitting all commands within the first set whose execution was deferred in response to completing the execution of the first command and changing the state of the attribute to the idle state.

18. The method of claim of claim 17, further comprising incrementing a command counter for each deferred command submitted to the execution pipeline.

19. The method of claim 18, decrementing the command counter for each deferred command submitted to the execution pipeline that is subsequently executed.

* * * * *